United States Patent
Kuchibhotla et al.

(10) Patent No.: US 9,698,944 B2
(45) Date of Patent: Jul. 4, 2017

(54) METHODS FOR COMMUNICATING SIMULTANEOUSLY ON MULTIPLE FREQUENCIES

(71) Applicant: MOTOROLA MOBILITY LLC, Chicago, IL (US)

(72) Inventors: Ravi Kuchibhotla, Gurnee, IL (US); Robert T. Love, Barrington, IL (US); Ravikiran Nory, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/251,997

(22) Filed: Apr. 14, 2014

(65) Prior Publication Data

US 2015/0156671 A1 Jun. 4, 2015

Related U.S. Application Data

(60) Provisional application No. 61/911,657, filed on Dec. 4, 2013.

(51) Int. Cl.
| | |
|---|---|
| *H04L 1/18* | (2006.01) |
| *H04W 72/04* | (2009.01) |
| *H04L 5/00* | (2006.01) |
| *H04W 72/00* | (2009.01) |

(52) U.S. Cl.
CPC .......... *H04L 1/1861* (2013.01); *H04L 5/0053* (2013.01); *H04L 5/0055* (2013.01); *H04W 72/0446* (2013.01); *H04W 72/00* (2013.01)

(58) Field of Classification Search
None
See application file for complete search history.

(56) References Cited

U.S. PATENT DOCUMENTS

| | | | | |
|---|---|---|---|---|
| 2005/0288026 | A1* | 12/2005 | Byun | H04W 36/18 455/442 |
| 2008/0242321 | A1* | 10/2008 | Inoue et al. | 455/458 |
| 2009/0016363 | A1* | 1/2009 | Laroia | H04W 72/02 370/401 |
| 2010/0271970 | A1 | 10/2010 | Pan et al. | |
| 2011/0243066 | A1 | 10/2011 | Nayeb Nazar et al. | |

(Continued)

FOREIGN PATENT DOCUMENTS

EP    1482671 A1    12/2004

OTHER PUBLICATIONS

CATT: "UCI t ransmission for FDD-TDD carrier aggregation", 3GPP Draft; R1-134097, [Online] vol. RAN WG1, No. Guangzhou, China; 20131007-20131011, Nov. 7, 2013 (Nov. 7, 2013)-Nov. 11, 2013 (Nov. 11, 2013), XP050717289.

(Continued)

*Primary Examiner* — Brandon Renner
*Assistant Examiner* — Jay Vogel
(74) *Attorney, Agent, or Firm* — Lerner, David, Littenberg, Krumholz & Mentlik, LLP

(57) ABSTRACT

This disclosure describes methods for communicating simultaneously on multiple frequencies. In various implementations, if a wireless terminal receives a first set of data and a second set of data simultaneously on different frequencies, then it sends signals responsive to the first and second sets of data on different slots of a single uplink subframe and on different frequencies.

2 Claims, 7 Drawing Sheets

(56) References Cited

U.S. PATENT DOCUMENTS

2012/0258716 A1* 10/2012 Ahn et al. .................... 455/436
2012/0327885 A1    12/2012 Chung et al.
2014/0241303 A1*  8/2014 Yoon .................. H04L 27/2613
                                                           370/329
2015/0200762 A1*  7/2015 Kim et al. ............ H04L 5/0055

OTHER PUBLICATIONS

Huawei et al: "Details of TDD-FDD CA", 3GPP Draft; R1-134056, [Online] vol. RAN WG1, No. Guangzhou, China; 20131007-20131011, Nov. 7, 2013 (Nov. 7, 2013)-Nov. 11, 2013 (Nov. 11, 2013), XP050717248.

International Search Report and Written Opinion for Application No. PCT/US2014/067902 dated Feb. 20, 2015.

Office Action for Canadian Patent Application No. 2,932,561, dated Feb. 2, 2017.

Examination Report No. 1 for standard patent application, No. AU2014357429, dated Mar. 20, 2017.

* cited by examiner

METHODS FOR COMMUNICATING SIMULTANEOUSLY ON MULTIPLE FREQUENCIES

CROSS-REFERENCE TO RELATED APPLICATIONS

The present application claims priority to U.S. Provisional Patent Application 61/911,657, filed Dec. 4, 2013, the contents of which are incorporated herein by reference.

TECHNICAL FIELD

The present disclosure relates generally to wireless network communication and, more particularly, to methods for communicating simultaneously on multiple frequencies.

BACKGROUND

There has recently been a push for the deployment of so-called "small cells" in wireless networks. Small cells are low-powered versions of traditional cells or macrocells. Examples of small cells include femtocells, picocells, and microcells. As demand for bandwidth has increased, small cells provide a way for network operators to offload some of their broadband traffic. Sharing traffic among small cells and macrocells adds a layer of complexity to wireless communication, however. For example, wireless terminals need to have multiple transmitters to communicate with both small cells and macrocells because small cells and macrocells typically communicate on different parts of the radio spectrum.

In current implementations of the Long-Term Evolution ("LTE") set of standards, when a wireless terminal receives data on a downlink subframe, it transmits an Acknowledgement or Non-Acknowledgement ("ACK" or "NACK") of those data using an uplink subframe that is no more than four subframes later than the downlink subframe. Each ACK or NACK is spread over two slots of the uplink subframe. While this technique may be adequate when the wireless terminal is transmitting using a single frequency, it can impose limitations on dual-use terminals. Dual-use terminals typically have two transmitters: one for communicating with macrocells (on a first frequency) and one for communicating with small cells (on a second frequency). In particular, simultaneous transmissions from the two transmitters tend to cause the transmitters to interfere with one another.

BRIEF DESCRIPTION OF THE SEVERAL VIEWS OF THE DRAWINGS

While the appended claims set forth the features of the present techniques with particularity, these techniques may be best understood from the following detailed description taken in conjunction with the accompanying drawings of which:

DETAILED DESCRIPTION

Figure 1:
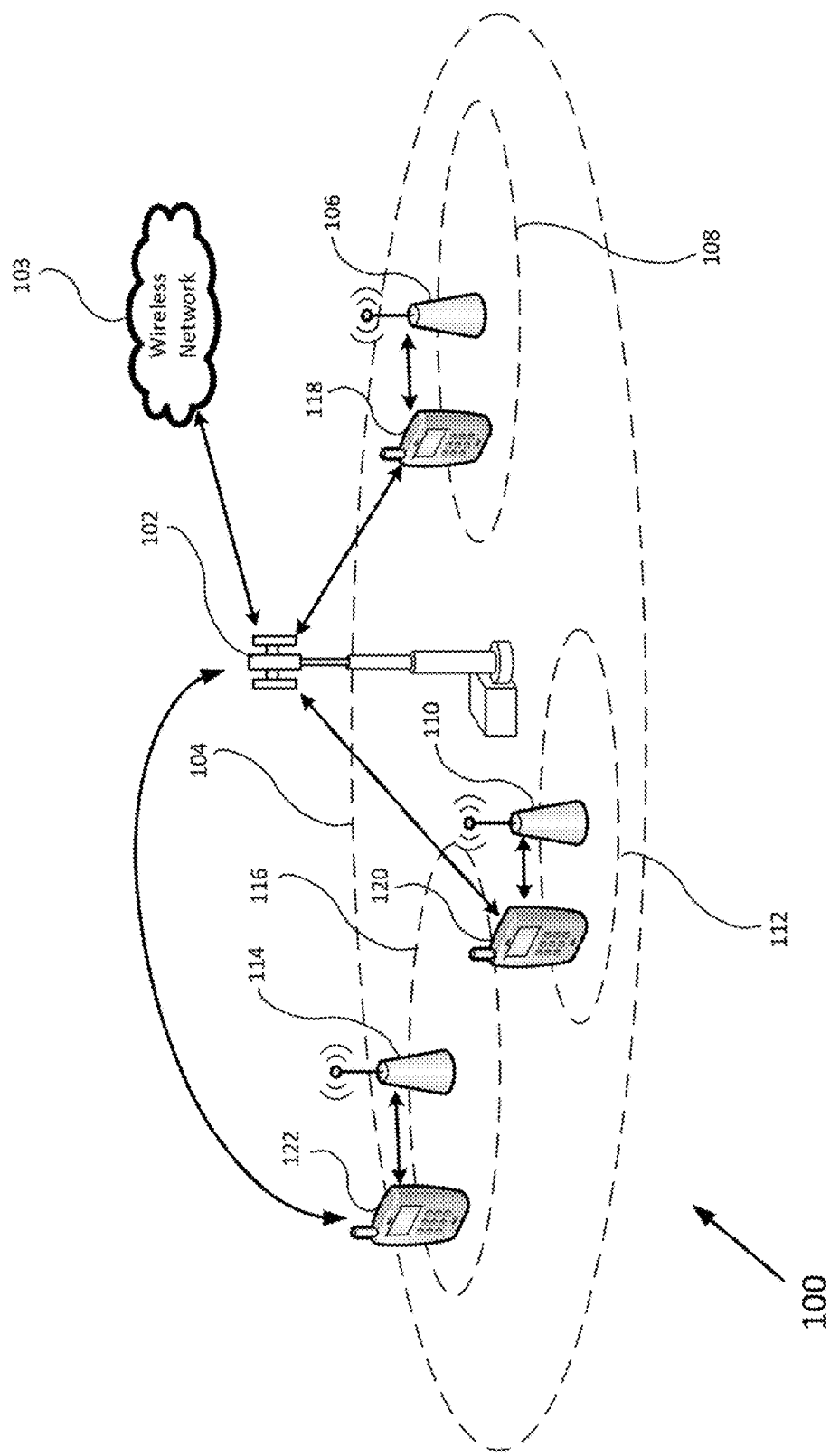
FIG. 1 is a block diagram of a communication system.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure describes methods for communicating simultaneously with multiple base stations. In various embodiments, if a wireless terminal receives data on multiple downlink frequencies, then it responds to each instance of data on a different slot of a single uplink subframe but on different uplink frequencies. "Frequency" as used herein is not limited to a single, discrete frequency, but can include the range of frequencies encompassed by a subframe, including each resource block and subcarrier of the subframe.

Turning to FIG. 1, a wireless communication system 100 according to an embodiment includes a macrocell base station 102 that controls a macrocell 104. The macrocell base station 102 is one of many macrocell base stations of a wireless network 103 and is connected to other parts of the wireless network 103 by one or more well-known mechanisms. Located within the coverage area of the macrocell 104 are a first small-cell base station 106 that controls a first small cell 108, a second small-cell base station 110 that controls a second small cell 112, and a third small-cell base station 114 that controls a third small cell 116. A first wireless terminal 118 operates within the coverage area of both the macrocell 104 and the first small cell 108, a second wireless terminal 120 operates within the coverage area of both the macrocell 104 and the second small cell 112, and a third wireless terminal 122 operates within the coverage area of both the macrocell 104, and the third small cell 116. Possible implementations of the wireless network 103 include a cellular network (such as an LTE network) and an Institute of Electrical and Electronics Engineers ("IEEE") 802.11x network. Possible implementations of the cells, base stations, and wireless terminals are ones that can communicate in an LTE network or an IEEE 802.11x network.

The first wireless terminal 118, the second wireless terminal 120, and the third wireless terminal 122 are each capable of dual-mode communication. That is, each is capable of communicating simultaneously with a small-cell base station and with a macrocell base station. The first wireless terminal 118 communicates with the first small-cell base station 106 and with the macrocell base station 102. The second wireless terminal 120 communicates with the second small-cell base station 110 and with the macrocell base station 102. The third wireless terminal 122 communicates with the third small-cell base station 114 and with the macrocell base station 102.

The wireless terminals and base stations of FIG. 1 communicate with one another in radio frames, in which each frame is composed of a number of non-overlapping subframes. Each subframe is composed of a number of non-overlapping slots. In an embodiment of the disclosure, the macrocell base station 102 is synchronized with the small-cell base stations. In other words, the frame and subframe timing of the macrocell 104 is in sync with the frame and subframe timing of the first small cell 108, the second small cell 112, and the third small cell 116. In one embodiment, each radio frame is a 10 millisecond FDD LTE frame having 10 subframes of 1 millisecond each, with each subframe having two 0.5 millisecond slots. In another embodiment, each radio frame is a 10 millisecond TDD LTE frame having 10 subframes of 1 millisecond each, with each subframe having two 0.5 millisecond slots. In one embodiment, the wireless terminals transmit ACK-NACKs on resource blocks of a Physical Uplink Control Channel ("PUCCH"). The PUCCH resource blocks are located proximate to the upper limit and proximate to the lower limit (e.g., uppermost and lowermost subcarriers) of the range of frequencies of an uplink subframe.

Referring still to FIG. 1, the types of data traffic that pass between the wireless terminals and base stations are classified according to their Quality of Service ("QoS") class. In an embodiment, the possible QoS classes include (1) conversational-class data, such as voice telephony and video telephony, (2) streaming-class data, such as one-way video or audio streaming, (3) interactive-class data, which are data sent in response to a request (e.g., web browsing, database retrieval, server access, polling for measurement records, and automatic data base inquiries), and (4) background-class data, which are data sent and received in the background (e.g., email and short-message-service messages).

Figure 2:
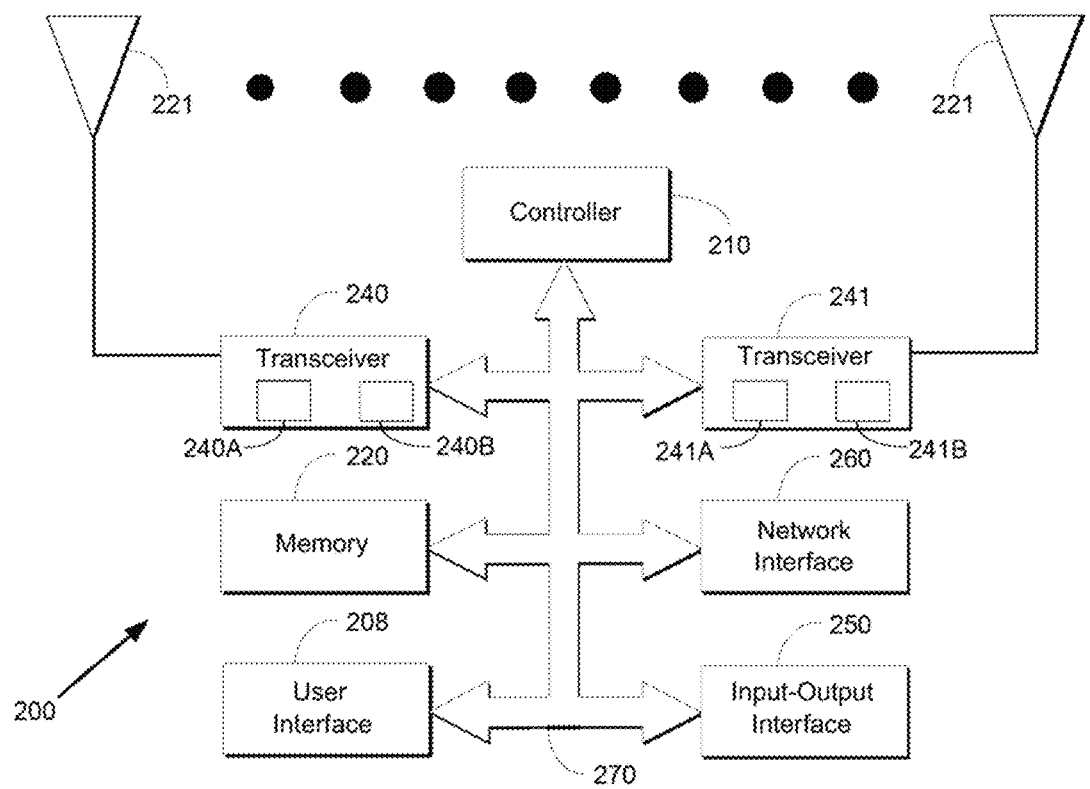
FIG. 2 is a block diagram of a representative wireless terminal or base station.

FIG. 2 illustrates a device 200 that is a possible implementation of a base station or wireless terminal of FIG. 1. The device 200 includes a user interface 208, a controller 210, a memory 220 (which can be implemented as volatile memory or non-volatile memory), a first transceiver 240, a second transceiver 241, an input-output interface 250, a network interface 260, and one or more antennas 221. The controller 210 retrieves instructions from the memory 220 and operates according to those instructions to provide outgoing data to and receive incoming data from the first transceiver 240 and the second transceiver 241. The controller 210 also receives data from and sends data to external devices via the input-output interface 250. If the device 200 is a base station, then the network interface 260 is coupled to a backhaul network, and the controller 210 can transmit data to other elements of the wireless network 103 (FIG. 1) via the backhaul network.

The first transceiver 240 includes a transmitter 240A and a receiver 240B. The second transceiver 241 includes a transmitter 241A and a receiver 241B. During operation, each transceiver receives data from the controller 210 and transmits radio-frequency ("RF") signals representing the data via one or more of the antennas 221. Similarly, each transceiver receives RF signals via one or more of the antennas 221, converts the signals into the appropriately-formatted data, and provides the data to the controller 210.

Each of the elements of the device 200 is communicatively linked to the other elements via data pathways 270. Possible implementations of the data pathways 270 include wires, conductive pathways on a microchip, and wireless connections. Possible implementations of the controller 210 include a microprocessor, a microcontroller, and a computer. Possible implementations of the network interface 260 include a modem, a network interface card, and a wireless local area network chipset.

In an FDD embodiment of the disclosure, if a wireless terminal (e.g., any of the wireless terminals of FIG. 1) receives a first set of data in a downlink subframe on a first downlink frequency and a second set of data in a downlink subframe on a second downlink frequency, then it responds to the first set of data and second set of data in a single uplink subframe but on different, non-overlapping slots and on different uplink frequencies (a first uplink frequency and a second uplink frequency). In a TDD embodiment of the disclosure, if a wireless terminal receives a first set of data on a first frequency in a downlink subframe and a second set of data on a second frequency in a downlink subframe, then it responds to the first set of data on the first frequency and to the second set of data on the second frequency. The responses, however, are sent in a single uplink subframe, but on different, non-overlapping slots. Thus, in an FDD embodiment there are four different frequencies—a first uplink frequency, a first downlink frequency, a second uplink frequency, and a second downlink frequency. In a TDD embodiment there are two frequencies—a first uplink-downlink frequency and a second uplink-downlink frequency. In both the FDD and TDD embodiments, the downlink subframe and uplink subframe may be separated by a fixed offset. For example, the uplink subframe may be four subframes after the downlink subframe.

Figure 3A:
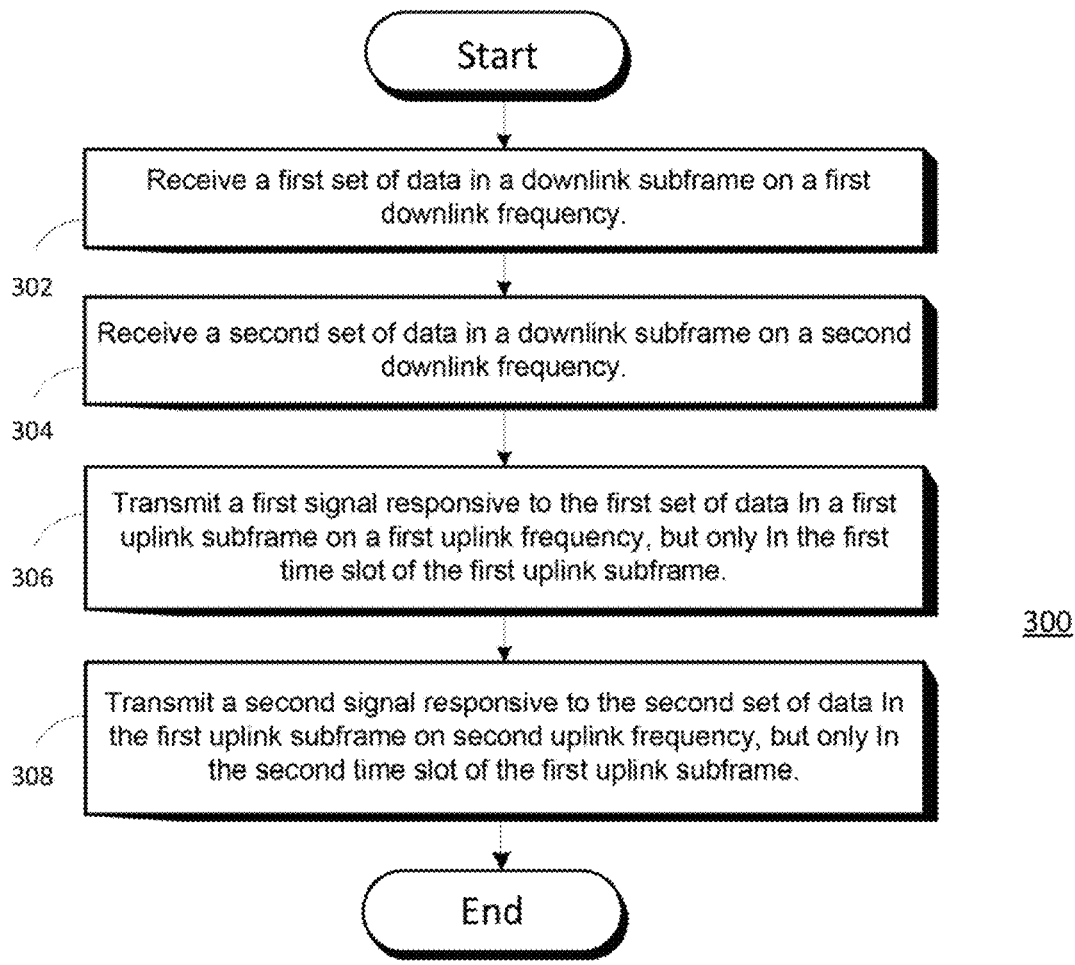
FIG. 3A is a flowchart of a frequency-division-duplexed ("FDD") method for communicating simultaneously with multiple base stations.

Turning to FIG. 3A, a flowchart 300 illustrates an FDD embodiment of the disclosure. At step 302, a wireless terminal receives a first set of data in a downlink subframe on a first downlink frequency. At step 304, the wireless terminal receives a second set of data in a downlink subframe on a second downlink frequency. At step 306, the wireless terminal transmits a first signal responsive to the first set of data in the first time slot, but not the second time slot, in a first uplink subframe on a first uplink frequency. At step 308, the wireless terminal transmits a second signal responsive to the second set of data in the second timeslot, but not the first time slot, of the uplink subframe on a second uplink frequency. Each of the first and second time slots is smaller than subframe in which they occur. The first and second time slots do not overlap.

Figure 3B:
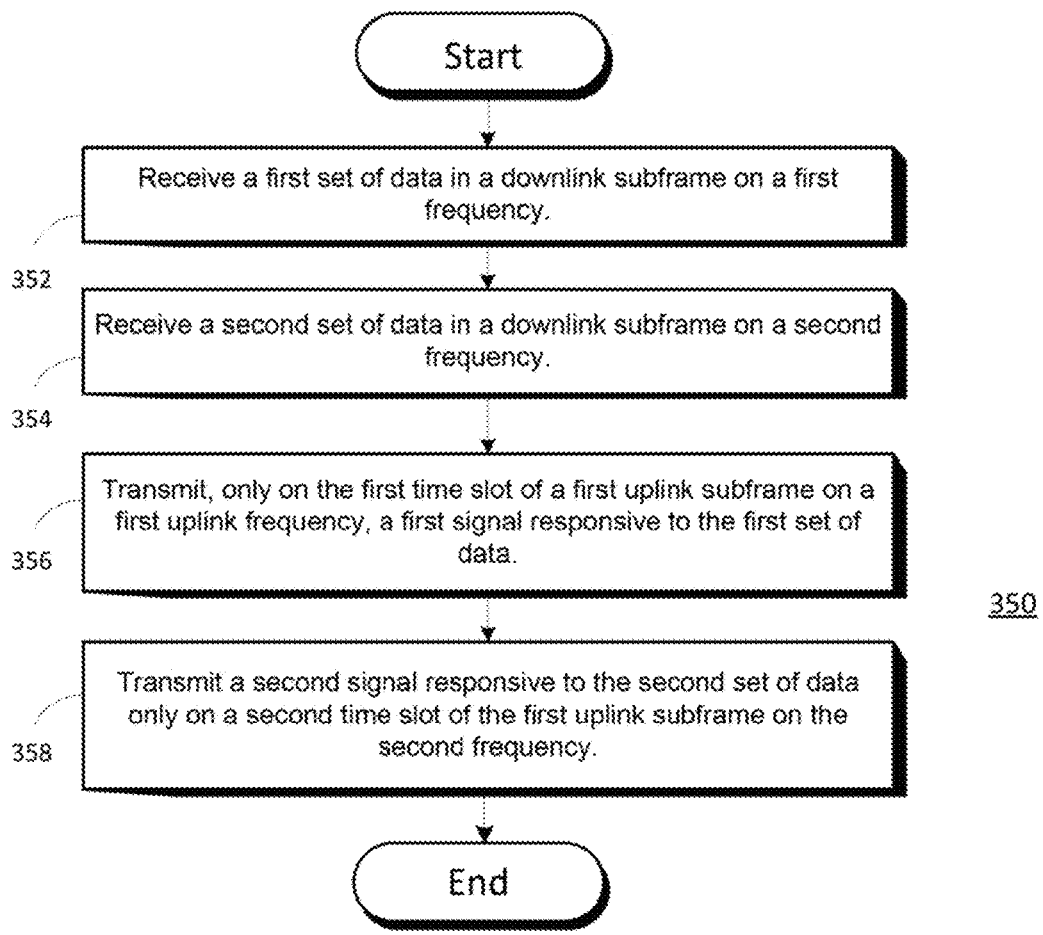
FIG. 3B is a flowchart of a time-division-duplexed ("TDD") method for communicating simultaneously with multiple base stations.

Turning to FIG. 3B, a flowchart 350 illustrates a TDD embodiment of the disclosure. At step 352, the wireless terminal receives a first set of data in a downlink subframe on a first frequency. At step 354, the wireless terminal receives a second set of data in a downlink subframe on a second frequency. At step 356, the wireless terminal transmits a first signal responsive to the first set of data in the first time slot, but not the second time slot, of the uplink subframe on the first frequency. At step 358, the wireless terminal transmits a second signal responsive to the second set of data in the second time slot, but not the first time slot, of the uplink subframe. Each of the first and second time slots is smaller than the uplink subframe. The first and second time slots do not overlap.

Figure 4:
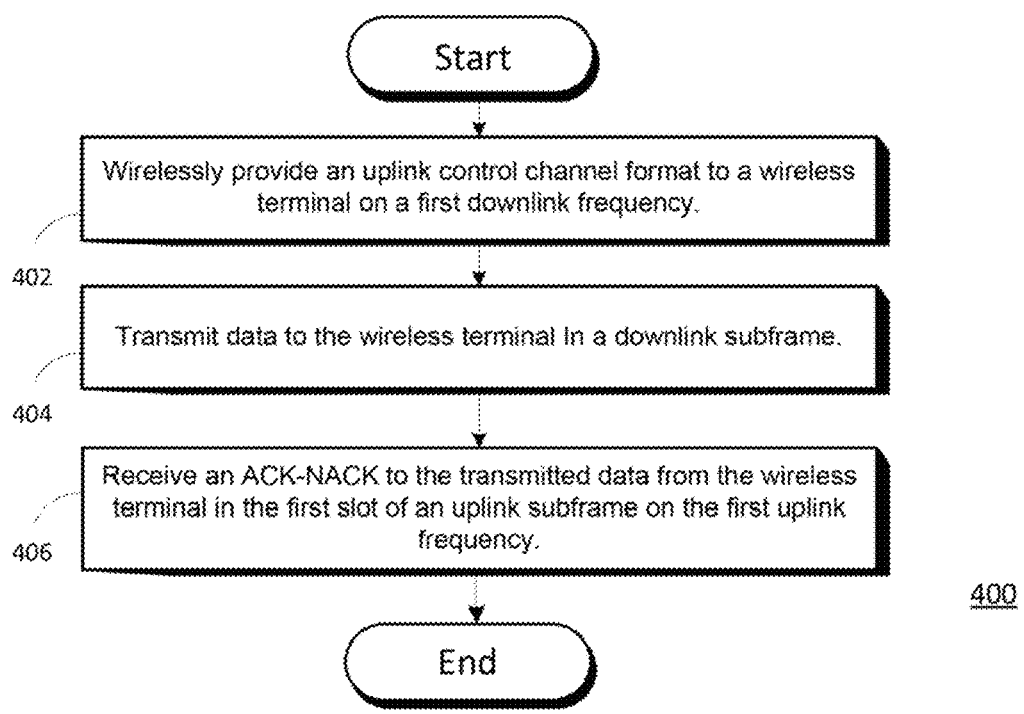
FIG. 4 is a flowchart of a method for configuring a wireless terminal to communicate simultaneously with multiple base stations.

According to an embodiment, a macrocell base station signals an uplink control channel format (e.g., a PUCCH format) to a wireless terminal in order to inform the wireless terminal that it is to carry out ACK-NACKs using a particular method, such as the method illustrated in FIG. 3A or the method illustrated in FIG. 3B. The wireless terminal then begins using the signaled format (e.g., the signaled PUCCH format). Turning to FIG. 4, a flowchart 400 illustrates this process. At step 402, the macrocell base station provides an uplink control channel format to a wireless terminal on a downlink frequency. In one embodiment, the control channel format is defined according to a communication standard shared by the macrocell base station and the wireless terminal (e.g., an LTE communication standard) and specifies that the wireless terminal is to transmit ACK-NACK messages to the macrocell base station in a first slot of an uplink subframe on an uplink frequency and transmit ACK-NACK messages to the small-cell base station in a second slot of the uplink subframe on an uplink frequency. At step 404, the macrocell base station transmits data to the wireless terminal in a downlink subframe. At step 406, the macrocell base station 102 receives an ACK-NACK to the transmitted data from the wireless terminals in the first slot of the uplink subframe on the uplink frequency. The slot positions can be reversed so that the ACK-NACKs to the macrocell base station 102 are in the second slot of the uplink subframe and the ACK-NACKs to the small-cell base station are in the first slot. Furthermore, in a TDD embodiment, the downlink frequency and the uplink frequency are the same.

In some embodiments, the macrocell base station 102 signals the wireless terminals to indicate to them which kind of data they are to receive from each base station. For example, if the macrocell base station 102 provides both conversational-class data and streaming-class data to the first wireless terminal 118, then the macrocell base station 102 may, upon determining that the first wireless terminal 118 is within the coverage area of the first small cell 108, indicate to the first wireless terminal 118 (via higher-layer signaling) that the first wireless terminal 118 should switch over to the first small cell 108 to receive streaming-class data from the first small-cell base station 106 but should continue to stay connected to the macrocell 104 in order to continue to receive conversational-class data from the macrocell base station 102.

Although the flowchart 300, the flowchart 350, and the flowchart 400 only refer to two time slots, other embodiments can have more than two (non-overlapping) time slots. Furthermore, this disclosure can apply when the wireless terminal is communicating with multiple small-cell base station and no macrocell base stations, multiple macrocell base stations and no small-cell base stations, or a mix of small-cell base stations and macrocell base stations.

Figure 5:
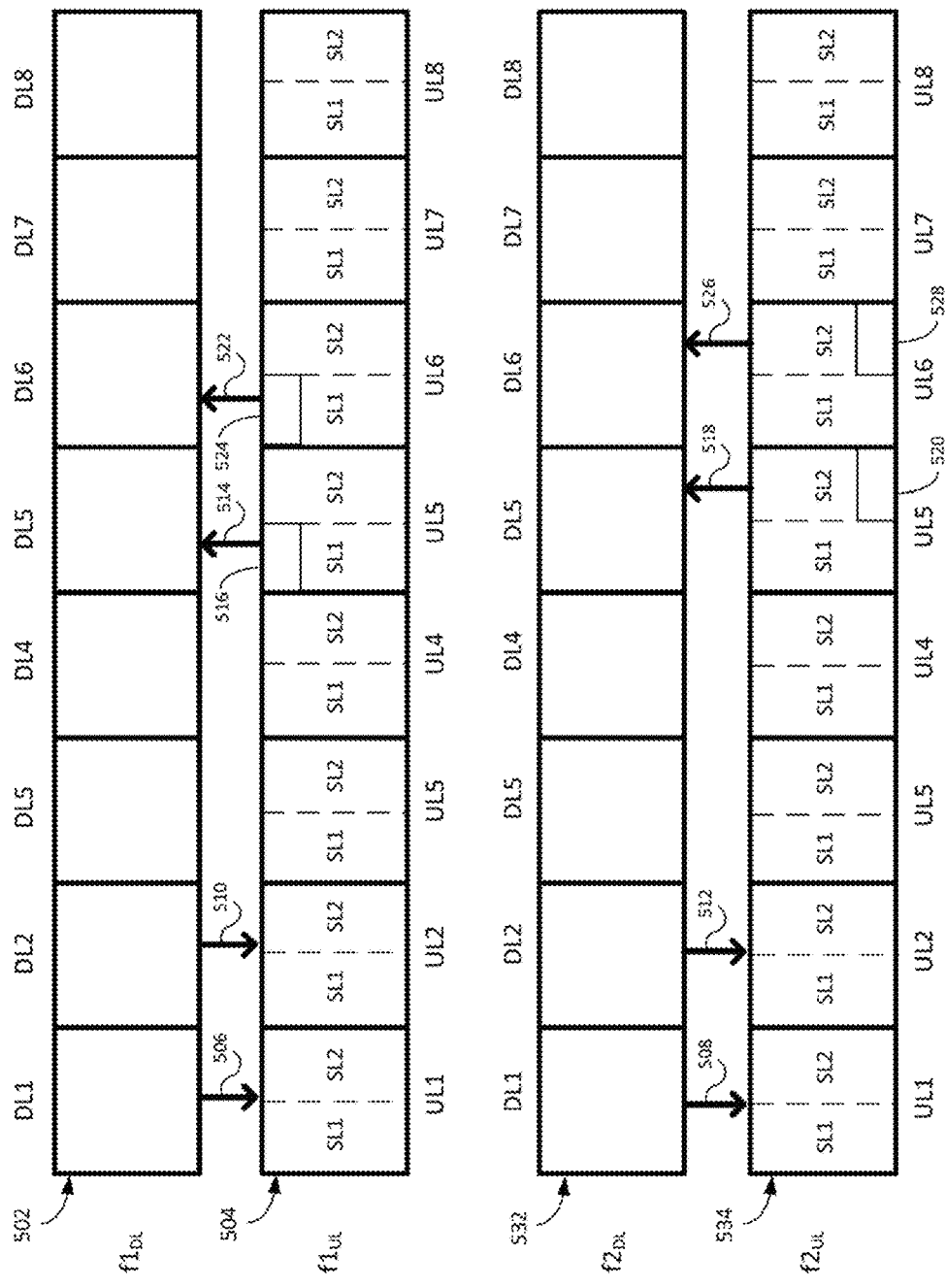
FIG. 5 illustrates FDD subframe configurations to be used for communicating simultaneously with multiple base stations.

To illustrate an embodiment of the disclosure, assume that the wireless terminal 118 communicates with the macrocell base station 102 and with the small-cell base station 106 using FDD communication as shown in FIG. 5. The first wireless terminal 118 receives data from the macrocell base station 102 on frequency $f1_{DL}$ in a first set 502 of subframes DL1 through DL8 and transmits data to the macrocell base station 102 on frequency $f1_{DL}$ in a second set 504 of subframes UL1 through UL8. The first wireless terminal 118 receives data from the first small-cell base station 106 in a third set 532 of subframes DL1 through DL8 on frequency $f2_{DL}$ and transmits data to the first small-cell base station 106 on frequency $f2_{DL}$ in a fourth set 534 of subframes UL1 through UL8.

In an embodiment of the disclosure, the first wireless terminal 118 transmits a response to the data received from the macrocell base station 102 on the first uplink frequency $f1_{UL}$ in time slot SL1, but not in time slot SL2, of one of the uplink subframes UL1 through UL8. The first wireless terminal 118 transmits a response to the data received from the first small-cell base station 106 in time slot SL2, but not in time slot SL1, of one of the uplink subframes UL1 through UL8.

To give another example, assume the following. (1) The first wireless terminal 118 receives a first set 506 of data from the macrocell base station 102 in subframe DL1 on the first downlink frequency $f1_{DL}$. (2) While receiving the first set 506 of data, the wireless terminal 118 also receives a second set 508 of data from the small-cell base station 106 in subframe DL1 on the second downlink frequency $f2_{DL}$. (3) The wireless terminal 118 receives a third set 510 of data from the macrocell base station 102 in subframe DL2 on the first downlink frequency $f1_{DL}$. (4) While receiving the third set 510 of data, the wireless terminal 118 receives a fourth set 512 of data from the small-cell base station 106 in subframe DL2 on the second downlink frequency $f2_{DL}$. (5) The first set 506 of data and the third set 510 of data are conversational-class data. (6) The second set 508 of data and the fourth set 512 of data are streaming-class data, interactive-class data, or background-class data.

On PUCCH resource blocks 516, time slot SL1 (but not time slot SL2), subframe UL5, frequency $f1_{UL}$, the wireless terminal 118 transmits an ACK-NACK 514 responsive to the first set 506 of data to the macrocell base station 102. On PUCCH resource blocks 520, time slot SL2 (but not time slot SL1), subframe UL5, frequency $f2_{UL}$, the wireless terminal 118 transmits an ACK-NACK 518 responsive to the second set 508 of data to the small-cell base station 106. On PUCCH resource blocks 524, time slot SL1 (but not time slot SL2), subframe UL6, frequency $f1_{UL}$, the wireless terminal 118 transmits an ACK-NACK 522 responsive to the third set 510 of data to the macrocell base station 102. On PUCCH resource blocks 528, time slot SL2 (but not time slot SL1), subframe UL6, the wireless terminal 118 transmits an ACK-NACK 526 responsive to the fourth set 512 of data to the small-cell base station 106.

Figure 6:
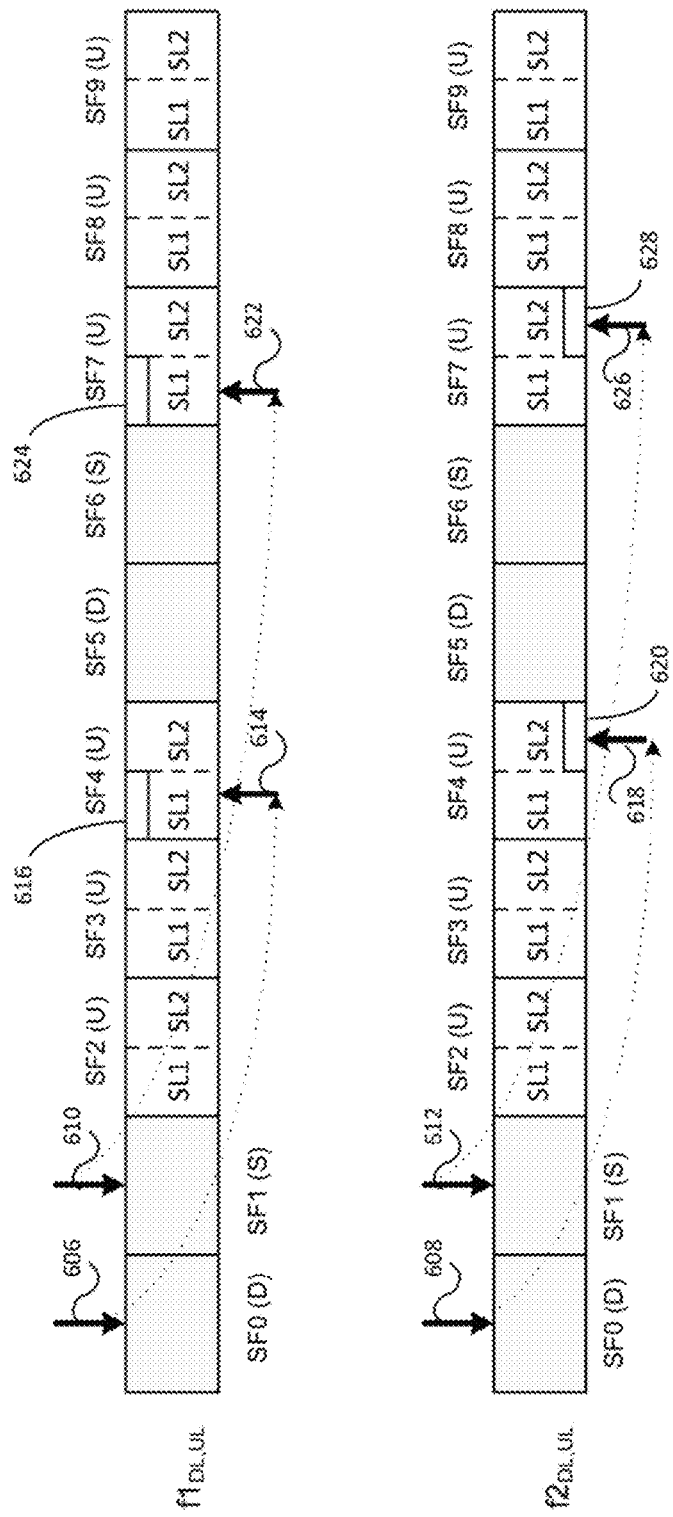
FIG. 6 illustrates TDD subframe configurations to be used for communicating simultaneously with multiple base stations.

Turning to FIG. 6, assume that the wireless terminal 118 communicates with the macrocell base station 102 and with the first small-cell base station 106 using the frame structure of FIG. 6, which includes TDD subframes SF0 through SF9. Those subframes designated "D" are downlink subframes, and those subframes designated "U" are uplink subframes. Those subframes designated "S" are special subframes, which are well known in the art. The wireless terminal 118 receives data from the macrocell base station 102 on frequency $f1_{DL,UL}$, in subframes SF0, SF1, and SF5. The wireless terminal 118 transmits data to the macrocell base station 102 on frequency $f1_{DL,UL}$ in subframes SF2, SF3, SF4, SF6, SF7, SF8, and SF9. The wireless terminal 118 receives data from the small-cell base station 106 on frequency $f2_{DL,UL}$ in subframes SF0, SF1, and SF5. The wireless terminal 118 transmits data to the small-cell base station 106 on frequency $f2_{DL,UL}$ in subframes SF2, SF3, SF4, SF6, SF7, SF8, and SF9.

To give yet another example, assume the following. (1) The wireless terminal 118 receives a first set 606 of data from the macrocell base station 102 on frequency $f1_{UL,DL}$, SF0. (2) While receiving the first set 606 of data, the wireless terminal 118 receives a second set 608 of data from the small-cell base station 106 on frequency $f2_{UL,DL}$, SF0. (3) The wireless terminal 118 receives a third set 610 of data from the macrocell base station 102 on frequency $f1_{UL,DL}$, SF1. (4) While receiving the third set 610 of data, the wireless terminal 118 receives a fourth set 612 of data on frequency $f2_{UL,DL}$. (5) The first set 606 of data and the second set 608 of data are conversational-class data. (6) The third set 610 of data and the fourth set 612 of data are streaming-class data.

In subframe SF4, the wireless terminal 118 (*a*) transmits an ACK-NACK 614 responsive to the first set 606 of data to the macrocell base station 102 on PUCCH resource blocks 616, time slot SL1 (but not time slot SL2), frequency $f1_{DL,UL}$, and (b) transmits an ACK-NACK 618 responsive to the second set 608 of data to the small-cell base station 106 on PUCCH resource blocks 620, time slot SL2 (but not time slot SL1), frequency $f2_{DL,UL}$. In subframe SF7, the wireless terminal (a) transmits an ACK-NACK 622 responsive to the third set 610 of data on PUCCH resource blocks 624, time slot SL1 (but not time slot SL2), frequency $f1_{DL,UL}$, and (b) transmits an ACK-NACK 626 responsive to the fourth set 612 of data to the small-cell base station 106 on PUCCH resource blocks 628, time slot SL2 (but not time slot SL1), frequency $f2_{DL,UL}$.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   receiving a first set of data of a single subframe in a first downlink subframe on a first downlink frequency;
   while receiving the first set of data, receiving a second set of data of a single subframe in the first downlink subframe on a second downlink frequency;
   transmitting a first signal responsive to the first set of data in a first time slot of a first uplink frequency on a first uplink subframe, not transmitting the first signal in a second time slot of the first uplink subframe on the first uplink frequency, and not transmitting the first signal in the first uplink subframe on a second uplink frequency; and
   transmitting a second signal responsive to the second set of data in the second time slot of the first uplink subframe on the second uplink frequency, not transmitting the second signal in the first time slot of the first uplink subframe on the second uplink frequency, and not transmitting the second signal in the first uplink subframe on the first uplink frequency;
   wherein the first downlink frequency, the second downlink frequency, the first uplink frequency and the second uplink frequency are each different frequencies;
   wherein each of the first and second time slots is smaller than the first uplink subframe;
   wherein the first and second time slots in the first uplink subframe do not overlap;
   wherein transmitting the first signal comprises transmitting the first signal over a Physical Uplink Control Channel ("PUCCH") using a first PUCCH format, the method further comprising:
   receiving, on the first downlink frequency, a third set of data of a single subframe in a second downlink subframe from a first base station; and
   transmitting, on the first uplink frequency, a third signal responsive to the third set of data over a PUCCH using a second PUCCH format on both time slots of a second uplink subframe.

2. The method of claim 1 wherein at least one of the downlink subframes and the first uplink subframe are separated by a fixed time offset.

* * * * *